United States Patent
Hanlon

(10) Patent No.: US 12,312,996 B2
(45) Date of Patent: May 27, 2025

(54) AIRCRAFT POWERPLANT WITH STEAM SYSTEM AND BYPASS

(71) Applicant: Raytheon Technologies Corporation, Farmington, CT (US)

(72) Inventor: Christopher J. Hanlon, Sturbridge, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/142,379

(22) Filed: May 2, 2023

(65) Prior Publication Data

US 2024/0369014 A1    Nov. 7, 2024

(51) Int. Cl.
*F02C 3/30* (2006.01)
*F02C 6/08* (2006.01)
*F02C 6/20* (2006.01)
*F02C 9/18* (2006.01)

(52) U.S. Cl.
CPC ............... *F02C 3/305* (2013.01); *F02C 3/30* (2013.01); *F02C 6/08* (2013.01); *F02C 6/20* (2013.01); *F02C 9/18* (2013.01); *F05D 2220/323* (2013.01); *F05D 2260/2322* (2013.01)

(58) Field of Classification Search
None
See application file for complete search history.

(56) References Cited

U.S. PATENT DOCUMENTS

| | | | |
|---|---|---|---|
| 3,693,347 A | | 9/1972 | Kydd |
| 3,921,389 A | * | 11/1975 | Kawaguchi ............... F02C 3/30 |
| | | | 60/39.59 |
| 3,978,661 A | * | 9/1976 | Cheng ................... F01K 21/047 |
| | | | 60/39.5 |

(Continued)

FOREIGN PATENT DOCUMENTS

| | | |
|---|---|---|
| EP | 1354794 B1 | 4/2006 |
| EP | 3048281 B1 | 4/2017 |

(Continued)

OTHER PUBLICATIONS

EP Search Report for EP Patent Application No. 24173859.0 dated Sep. 27, 2024.

*Primary Examiner* — Todd E Manahan
*Assistant Examiner* — Marc Amar
(74) *Attorney, Agent, or Firm* — Getz Balich LLC

(57) ABSTRACT

A powerplant is provided for an aircraft. This aircraft powerplant includes a turbine engine core, a steam system and a bypass system. The turbine engine core includes a flowpath, a compressor section, a combustor section and a turbine section. The flowpath extends through the compressor section, the combustor section and the turbine section from an inlet into the flowpath to an exhaust from the flowpath. The steam system includes an evaporator disposed along the flowpath downstream of the turbine section. The steam system is configured to evaporate water into steam using the evaporator. The steam system is configured to introduce the steam into the flowpath upstream of the turbine section. The bypass system is configured to bleed fluid from the flowpath upstream of the turbine section to provide bleed fluid. The bypass system is configured to direct the bleed fluid into the flowpath downstream of the evaporator.

20 Claims, 4 Drawing Sheets

(56) References Cited

U.S. PATENT DOCUMENTS

| | | | | |
|---|---|---|---|---|
| 4,631,914 | A | * | 12/1986 | Hines .................... F02C 9/18 60/39.55 |
| 5,014,508 | A | | 5/1991 | Lifka |
| 5,052,176 | A | | 10/1991 | Josiane |
| 5,054,279 | A | * | 10/1991 | Hines ................. F01K 21/047 60/39.5 |
| 5,414,992 | A | * | 5/1995 | Glickstein .............. F02C 7/224 60/39.83 |
| 6,065,283 | A | * | 5/2000 | Shouman ................. F02C 3/30 60/39.182 |
| 6,189,310 | B1 | * | 2/2001 | Kalitventzeff ........... F23R 3/40 60/777 |
| 7,165,744 | B2 | * | 1/2007 | Howarth ............... B64D 33/04 244/55 |
| 7,721,524 | B2 | | 5/2010 | Jahnsen |
| 10,934,894 | B2 | * | 3/2021 | Copeland ............ F01K 21/045 |
| 11,603,798 | B1 | * | 3/2023 | Terwilliger ............ F02C 7/224 |
| 11,635,022 | B1 | | 4/2023 | Terwilliger |
| 2006/0242942 | A1 | * | 11/2006 | Johnson ................... F02C 6/08 60/761 |
| 2008/0245050 | A1 | | 10/2008 | Wollenweber |
| 2009/0320487 | A1 | * | 12/2009 | Alkislar ................... F02K 1/34 60/771 |
| 2010/0175387 | A1 | * | 7/2010 | Foust ..................... F02C 7/185 60/785 |
| 2012/0260667 | A1 | * | 10/2012 | Chillar .................... F02C 6/08 60/39.83 |
| 2012/0285175 | A1 | * | 11/2012 | Fletcher ................. F02C 3/305 60/39.55 |
| 2013/0187007 | A1 | * | 7/2013 | Mackin .................... F02C 9/18 60/785 |
| 2017/0051679 | A1 | | 2/2017 | Becker, Jr. |
| 2019/0309685 | A1 | | 10/2019 | Stillman |
| 2019/0323519 | A1 | * | 10/2019 | Aoyama ............... F04D 29/545 |
| 2020/0355121 | A1 | * | 11/2020 | O'Meallie ............. F02C 7/277 |
| 2021/0001269 | A1 | | 1/2021 | Klingels |
| 2021/0207500 | A1 | * | 7/2021 | Klingels ................. F01K 23/10 |
| 2021/0285851 | A1 | | 9/2021 | Farouz-Fouquet |
| 2023/0150678 | A1 | | 5/2023 | Klingels |
| 2023/0366349 | A1 | * | 11/2023 | Klingels .................. F02C 7/16 |

FOREIGN PATENT DOCUMENTS

| | | |
|---|---|---|
| GB | 870268 A | 6/1961 |
| GB | 2190964 A | 12/1987 |
| RU | 2561757 C1 | 9/2015 |
| WO | WO-2022028652 A1 * | 2/2022 |

* cited by examiner

AIRCRAFT POWERPLANT WITH STEAM SYSTEM AND BYPASS

BACKGROUND OF THE DISCLOSURE

1. Technical Field

This disclosure relates generally to a powerplant and, more particularly, to injecting steam into a flowpath in a gas turbine engine of the powerplant.

2. Background Information

As government emissions standards tighten, interest in increasing gas turbine engine efficiency continues to grow. Steam may be introduced into a flowpath of a gas turbine engine to increase efficiency. Various systems and methods are known in the art for introducing steam into an engine flowpath. While these known systems and methods have various advantages, there is still room in the art for improvement.

SUMMARY OF THE DISCLOSURE

According to an aspect of the present disclosure, a powerplant is provided for an aircraft. This aircraft powerplant includes a turbine engine core, a steam system and a bypass system. The turbine engine core includes a flowpath, a compressor section, a combustor section and a turbine section. The flowpath extends through the compressor section, the combustor section and the turbine section from an inlet into the flowpath to an exhaust from the flowpath. The steam system includes an evaporator disposed along the flowpath downstream of the turbine section. The steam system is configured to evaporate water into steam using the evaporator. The steam system is configured to introduce the steam into the flowpath upstream of the turbine section. The bypass system is configured to bleed fluid from the flowpath upstream of the turbine section to provide bleed fluid. The bypass system is configured to direct the bleed fluid into the flowpath downstream of the evaporator.

According to another aspect of the present disclosure, another powerplant is provided for an aircraft. This aircraft powerplant includes a turbine engine core, a steam system and a bypass system. The turbine engine core includes a flowpath, a compressor section, a combustor section, a high pressure turbine section and a low pressure turbine section. The flowpath extends through the compressor section, the combustor section, the high pressure turbine section and the low pressure turbine section from an inlet into the flowpath to an exhaust from the flowpath. The steam system is configured to evaporate water into steam. The steam system is configured to introduce the steam into the flowpath upstream of the high pressure turbine section. The bypass system is configured to bleed fluid from the flowpath upstream of the high pressure turbine section to provide bleed fluid. The bypass system is configured to direct the bleed fluid into the flowpath downstream of the low pressure turbine section.

According to still another aspect of the present disclosure, another powerplant is provided for an aircraft. This aircraft powerplant includes a turbine engine core, a steam system and a bypass system. The turbine engine core includes a flowpath, a compressor section, a combustor section and a turbine section. The flowpath extends through the compressor section, the combustor section and the turbine section from an inlet into the flowpath to an exhaust from the flowpath. The steam system is configured to condense water vapor flowing through a region of the flowpath into the water. The steam system is configured to collect the water and then evaporate the water to provide steam. The steam system is configured to introduce the steam into the flowpath. The bypass system is configured to bleed fluid from the flowpath upstream of the region of the flowpath to provide bleed fluid. The bypass system is configured to direct the bleed fluid into the flowpath downstream of the region of the flowpath. The bypass system is operated based on operation of the steam system.

The steam system may be configured to introduce the steam into the flowpath upstream of the turbine section. In addition or alternatively, the bypass system may be configured to bleed fluid from the flowpath upstream of the turbine section.

The steam system may be configured to evaporate water into the steam using an evaporator. The bypass system may be configured to direct the bleed fluid into the flowpath downstream of the evaporator.

The steam system may be configured to introduce the steam into the flowpath at a steam introduction location along the flowpath. The bypass system may be configured to bleed the fluid from the flowpath upstream of the steam introduction location along the flowpath.

The steam system may be configured to introduce the steam into the flowpath at a steam introduction location along the flowpath. The bypass system may be configured to bleed the fluid from the flowpath at the steam introduction location along the flowpath.

The steam system may be configured to introduce the steam into the flowpath at a steam introduction location along the flowpath. The bypass system may be configured to bleed the fluid from the flowpath downstream of the steam introduction location along the flowpath.

The steam system may also include a water source configured to provide the water evaporated using the evaporator. The water source may be configured as or otherwise include a water reservoir.

The steam system may also include a water source configured to provide the water evaporated using the evaporator. The water source may be configured as or otherwise include a condenser disposed along the flowpath downstream of the evaporator.

The bypass system may be configured to direct the bleed fluid into the flowpath downstream of the condenser.

The steam system may be configured to condense water vapor flowing through the flowpath into the water using the condenser.

The bypass system may include a turbine driven by the bleed fluid.

The turbine may be configured to at least partially power a mechanical load outside of the turbine engine core.

The turbine may be configured to at least partially power a mechanical load within the turbine engine core.

The steam system may be configured to introduce the steam into the flowpath during a first mode of operation. The bypass system may be configured to bleed the fluid from the flowpath during the first mode of operation.

The steam system may not introduce the steam into the flowpath during a second mode of operation. The bypass system may not bleed the fluid from the flowpath during the second mode of operation.

The steam system may be configured to introduce the steam into the flowpath during a second mode of operation. The bypass system may not bleed the fluid from the flowpath during the second mode of operation.

The bypass system may be configured to bleed the fluid from the flowpath when the steam system introduces the steam into the flowpath to maintain a mass flow through the combustor section and/or the turbine section below a threshold.

The turbine section may be configured as or otherwise include a low pressure turbine section. The turbine engine core may also include a high pressure turbine section between the combustor section and the low pressure turbine section along the flowpath.

The aircraft powerplant may also include a mechanical load. The turbine engine core may be configured to power the mechanical load.

The mechanical load may be configured as or otherwise include a thrust rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
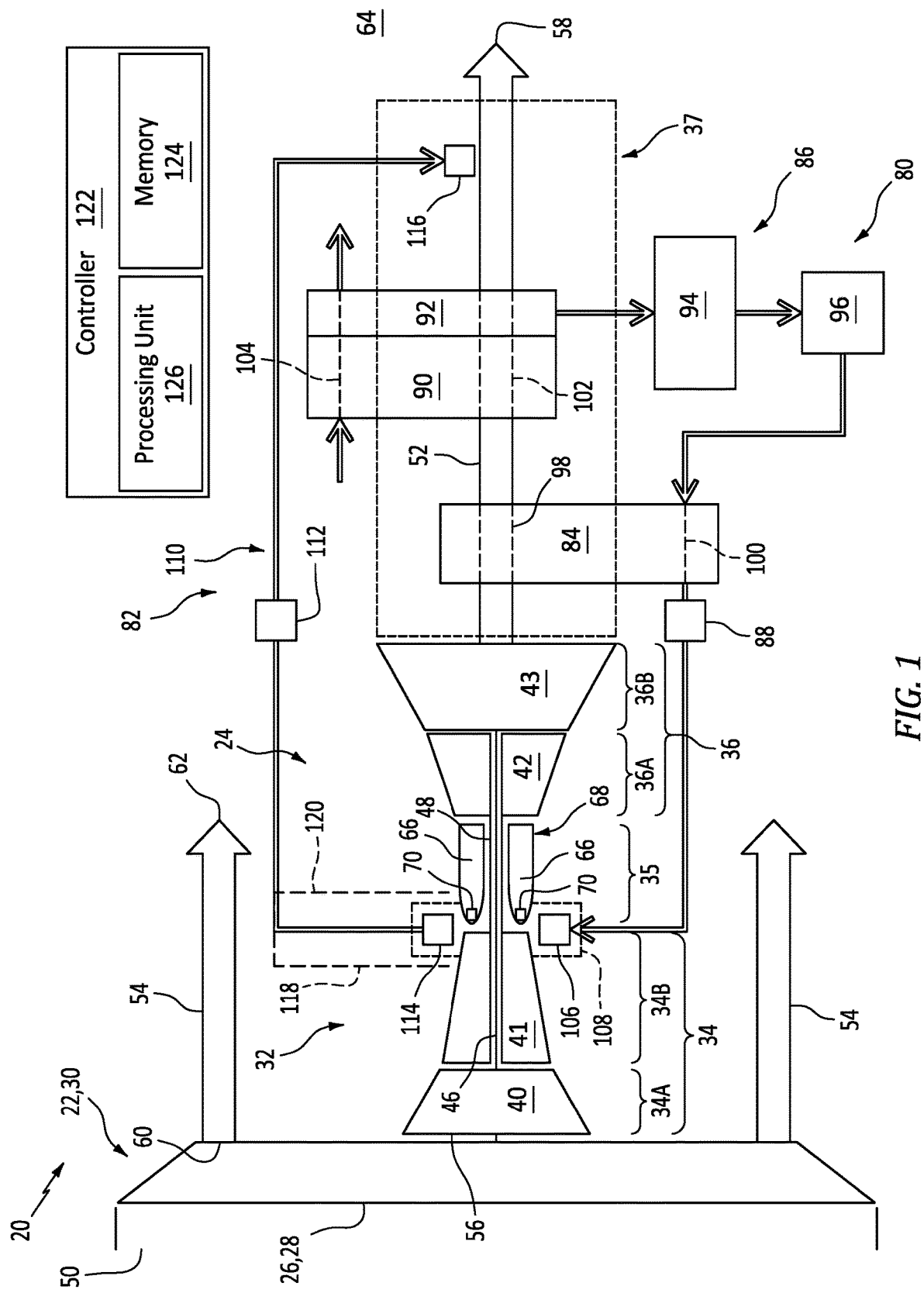
FIG. 1 is a schematic illustration of a powerplant with a steam system and a bypass system.

FIG. 1 illustrates a powerplant 20 for an aircraft. The aircraft may be an airplane, a drone (e.g., an unmanned aerial vehicle (UAV)) or any other manned or unmanned aerial vehicle. The powerplant 20 may be configured as, or otherwise included as part of, a propulsion system for the aircraft. The powerplant 20 may also or alternatively be configured as, or otherwise included as part of, an electrical power system for the aircraft. The powerplant 20 of FIG. 1 includes a mechanical load 22 and a powerplant engine 24; e.g., a gas turbine engine.

The mechanical load 22 of FIG. 1 includes at least one driven rotor 26. This driven rotor 26 may be configured as a bladed thrust rotor for the aircraft propulsion system. This thrust rotor may be a propulsor rotor for generating (e.g., forward) propulsive thrust. The thrust rotor may also or alternatively be a lift rotor for generating lift thrust. Examples of the thrust rotor include, but are not limited to, a fan rotor 28 for a ducted fan engine (e.g., a turbofan engine), a propeller rotor for a propeller engine (e.g., a turboprop engine), an open rotor for an open rotor engine (e.g., a pusher fan engine, an open tractor rotor engine, etc.), and a rotorcraft rotor (e.g., a main helicopter rotor) for a turboshaft engine. The driven rotor 26 may alternatively be configured as a generator rotor in an electric power generator for the power system. However, for ease of description, the mechanical load 22 is described below as a fan section 30 of the powerplant 20 and the driven rotor 26 is described below as the fan rotor 28.

The powerplant engine 24 of FIG. 1 includes a turbine engine core 32; e.g., a gas generator. This engine core 32 includes a core compressor section 34, a core combustor section 35, a core turbine section 36 and an exhaust section 37. The compressor section 34 may include a low pressure compressor (LPC) section 34A and a high pressure compressor (HPC) section 34B. The turbine section 36 may include a high pressure turbine (HPT) section 36A and a low pressure turbine (LPT) section 36B.

Each of the powerplant sections 30, 34A, 34B, 36A and 36B includes a respective bladed rotor 28 and 40-43. Each of the rotors 28, 40-43 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 and the LPC rotor 40 are connected to and driven by the LPT rotor 43 through a low speed shaft 46. At least (or only) the fan rotor 28, the LPC rotor 40, the low speed shaft 46 and the LPT rotor 43 may form a low speed rotating structure; e.g., a low speed spool. This low speed rotating structure may be configured as a direct drive rotating structure where the fan rotor 28, the LPC rotor 40 and the LPT rotor 43 rotate at a common speed. The low speed rotating structure, however, may alternatively be configured as a geared rotating structure with a geartrain (e.g., an epicyclic gearbox) coupled between the fan rotor 28 and the LPT rotor 43; e.g., between the fan rotor 28 and the LPC rotor 40. With such an arrangement, the fan rotor 28 rotates at a different (e.g., slower) speed than the LPT rotor 43. The HPC rotor 41 is connected to and driven by the HPT rotor 42 through a high speed shaft 48. At least (or only) the HPC rotor 41, the high speed shaft 48 and the HPT rotor 42 may form a high speed rotating structure; e.g., a high speed spool. Each of the powerplant rotating structures may be supported by a plurality of bearings and rotate about a (e.g., common) rotational axis, which rotational axis may also be an axial centerline of the powerplant 20, the powerplant engine 24 and/or the engine core 32.

During operation of the powerplant 20 of FIG. 1, air enters the powerplant 20 through an airflow inlet 50 into the powerplant 20. This air is directed through the fan section 30 and into a core flowpath 52 (e.g., annular core flowpath) and a bypass flowpath 54 (e.g., annular bypass flowpath). The core flowpath 52 extends sequentially through the LPC section 34A, the HPC section 34B, the combustor section 35, the HPT section 36A, the LPT section 36B and the exhaust section 37 from an inlet 56 into the core flowpath 52 to an exhaust 58 out of the core flowpath 52. The air within the core flowpath 52 may be referred to as "core air". The bypass flowpath 54 extends through a bypass duct, which bypasses (e.g., is radially outboard of and extends along) the powerplant engine 24 and its engine core 32, from an inlet 60 into the bypass flowpath 54 to an exhaust 62 out of the bypass flowpath 54. The air within the bypass flowpath 54 may be referred to as "bypass air". Briefly, the core inlet 56 and the bypass inlet 60 may each be fluidly coupled with, adjacent and downstream of the fan section 30. The airflow inlet 50, the core exhaust 58 and the bypass exhaust 62 may each be fluidly coupled with an environment 64 external to the powerplant 20; e.g., an external environment outside of the aircraft.

The core air is compressed by the LPC rotor 40 and the HPC rotor 41 and directed into a combustion chamber 66 of a combustor 68 (e.g., an annular combustor) in the combustor section 35. Fuel is injected into the combustion chamber 66 via one or more fuel injectors 70 and mixed with the compressed core air to provide a fuel-air mixture. This fuel-air mixture is ignited and combustion products thereof flow through and sequentially cause the HPT rotor 42 and the LPT rotor 43 to rotate. The rotation of the HPT rotor 42 and the LPT rotor 43 drives rotation of the HPC rotor 41 and the LPC rotor 40 and, thus, compression of the air received from the core inlet 56. The rotation of the LPT rotor 43 also drives rotation of the fan rotor 28, which propels the bypass air through and out of the bypass flowpath 54. The propulsion of the bypass air may account for a majority of thrust generated by the aircraft propulsion system. Of course, where the mechanical load 22 also or alternatively includes the generator rotor, the rotation of the LPT rotor 43 may drive the electric power generator to generate electricity.

Figure 2:
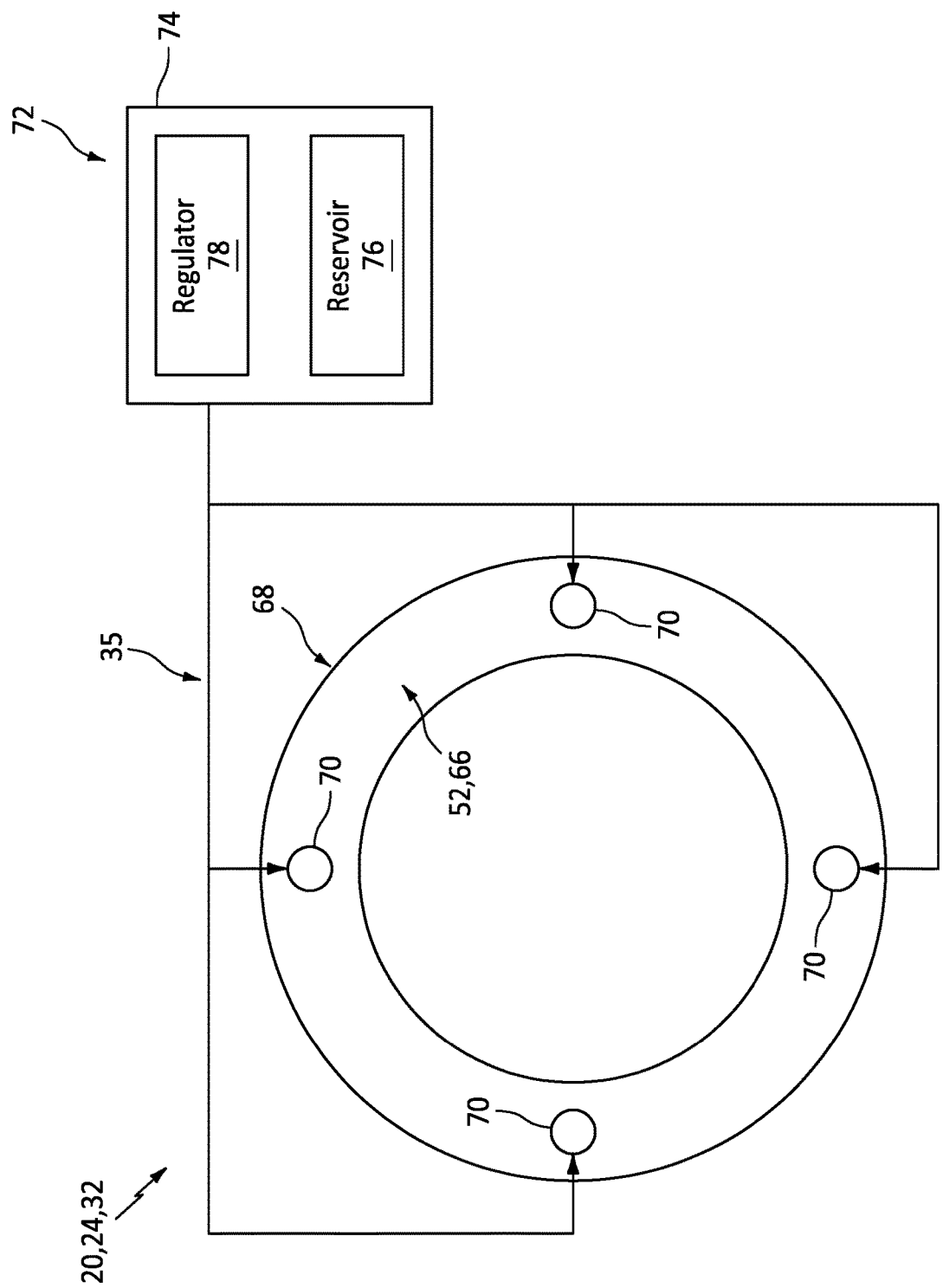
FIG. 2 is a schematic illustration of a fuel system for the powerplant.

Referring to FIG. 2, the powerplant 20 includes a fuel system 72 for delivering the fuel to the combustor section 35 and its combustor 68. This fuel system 72 includes a fuel source 74 and the one or more fuel injectors 70. The fuel source 74 of FIG. 2 includes a fuel reservoir 76 and/or a fuel flow regulator 78; e.g., a valve and/or a pump. The fuel reservoir 76 is configured to store the fuel before, during and/or after turbine engine operation. The fuel reservoir 76, for example, may be configured as or otherwise include a tank, a cylinder, a pressure vessel, a bladder or any other type of fuel storage container. The fuel flow regulator 78 is configured to direct and/or meter a flow of the fuel from the fuel reservoir 76 to the fuel injectors 70. The fuel injectors 70 may be arranged circumferentially about the rotational axis in an array. Each fuel injector 70 is configured to direct the fuel received from the fuel source 74 into the combustion chamber 66 for mixing with the compressed core air to provide the fuel-air mixture.

The powerplant engine 24 of FIG. 1 may be configured as a non-hydrocarbon turbine engine/a hydrocarbon free turbine engine. The powerplant engine 24, for example, may be configured as a hydrogen fueled turbine engine. The fuel injected into the combustion chamber 66 by the fuel injectors 70, for example, may be hydrogen ($H_2$) fuel; e.g., $H_2$ gas. The present disclosure, however, is not limited to hydrogen fueled turbine engines nor to non-hydrocarbon turbine engines. The powerplant engine 24, for example, may also or alternatively be fueled by another non-hydrocarbon fuel such as, but not limited to, ammonia ($NH_3$). The powerplant engine 24 may still also or alternatively be fueled using any other fuel, including hydrocarbon fuels (e.g., kerosene, jet fuel, sustainable aviation fuel (SAF) or other biofuels, etc.), which produces combustion products that include water ($H_2O$) vapor.

The powerplant 20 of FIG. 1 also includes a steam system 80 and a bypass system 82. Briefly, the bypass system 82 of FIG. 1 is different than and separate from the bypass flowpath 54.

The steam system 80 may be configured as a water and heat energy recovery system for the powerplant 20. The steam system 80, for example, may be configured to recover at least some of the water vapor produced by the combustion of the fuel-air mixture within the combustion chamber 66. The steam system 80 may also be configured to evaporate the recovered water using heat energy recuperated from the combustion products to provide steam for use in the powerplant engine 24 and its engine core 32; e.g., in the combustor section 35.

The steam system 80 of FIG. 1 includes an evaporator 84, a water source 86 and a steam control valve 88. The water source 86 of FIG. 1 includes a condenser 90, a water separator 92, a water reservoir 94 and a water flow regulator 96; e.g., a pump and/or a valve.

The evaporator 84 includes a gas flowpath 98 (e.g., a combustion products flowpath) and a fluid flowpath 100 (e.g., a water and/or steam flowpath). The condenser 90 includes a gas flowpath 102 (e.g., a combustion products flowpath) and a heat exchange (HX) flowpath 104. These heat exchangers 84, 90 may be arranged with (e.g., in) the exhaust section 37. The evaporator 84 and the condenser 90 are fluidly coupled (e.g., inline and/or sequentially) along the core flowpath 52 between the powerplant engine 24 and its LPT section 36B and the core exhaust 58. The core flowpath 52 of FIG. 1, for example, extends out from the LPT section 36B, sequentially through the evaporator gas flowpath 98 and the condenser gas flowpath 102, and to the core exhaust 58. It is contemplated, however, the order of the heat exchangers 84 and 90 along the core flowpath 52 may be different in other embodiments.

The water separator 92 is arranged with the condenser 90 along the core flowpath 52. The water separator 92, for example, may be configured as or otherwise include a gutter integrated with (e.g., into) the condenser 90, or connected downstream of the condenser 90 along the core flowpath 52. However, various other types of separators are known in the art, and the present disclosure is not limited to any particular ones thereof.

The water reservoir 94 is configured to hold water before, during and/or after steam system operation. The water reservoir 94, for example, may be configured as or otherwise include a tank, a cylinder, a pressure vessel, a bladder or any other type of water storage container. The water flow regulator 96 is configured to direct and/or meter a flow of the water from the water reservoir 94 to one or more downstream members of the steam system 80.

The steam system 80 is fluidly coupled with (and may include) one or more components 106 (one shown in FIG. 1 for ease of illustration) of the powerplant engine 24 and its engine core 32 through, for example, the steam control valve 88. One or more of these components 106 may each be configured as or otherwise include a steam injector. Each steam injector may be configured to inject the steam into the combustion chamber 66. One or more of the components 106 may also or alternatively be configured as an outlet for introducing the steam for cooling the combustor 68; e.g., a combustor wall, etc. The present disclosure, however, is not limited to the foregoing exemplary components which utilize the steam. The steam system 80, for example, may introduce the steam into the core flowpath 52 upstream of the combustor 68 and its combustion chamber 66 in order to deliver a mixture of the steam and the compressed air to the combustor 68. In another example, the steam system 80 may introduce the steam into the core flowpath 52 through a vane structure (e.g., a combustor exhaust nozzle/a turbine inlet nozzle) downstream of the combustor 68 and its combustion chamber 66. Moreover, various other uses for steam in a powerplant engine are known in the art, and the present disclosure is not limited to any particular one thereof.

During operation of the steam system 80, a cooling fluid is directed into the condenser 90 and its HX flowpath 104. Examples of the cooling fluid include, but are not limited to, the bypass air, the fuel (e.g., prior to being delivered to the fuel injectors 70), lubricant (e.g., oil), coolant, and ambient air from the external environment 64. The combustion products, including the water vapor, are directed into the condenser 90 and its condenser gas flowpath 102. The condenser 90 exchanges heat energy between the cooling fluid and the combustion products flowing within the condenser 90. During normal powerplant operation, the combustion products flowing within the condenser gas flowpath 102 are (e.g., significantly) warmer than the cooling fluid flowing within the HX flowpath 104. The condenser 90 is thereby operable to cool the combustion products using the cooling fluid. This cooling of the combustion products may condense at least some of the water vapor (e.g., the gaseous water) flowing within the condenser gas flowpath 102 into liquid water droplets. At least some or all of the liquid water may be collected and separated from the remaining gaseous combustion products by the water separator 92 and subsequently directed to the water reservoir 94 for (e.g., temporary) storage.

The water flow regulator 96 directs (e.g., pumps) the water from the water reservoir 94 into the evaporator 84 and its evaporator fluid flowpath 100. The combustion products (e.g., upstream of the condenser 90, downstream of the turbine section 36 and its LPT section 36B) are directed into the evaporator 84 and its evaporator gas flowpath 98. The evaporator 84 exchanges heat energy between the water and the combustion products flowing within the evaporator 84. During normal powerplant operation, the combustion products flowing within the evaporator gas flowpath 98 are (e.g., significantly) warmer than the water flowing within the evaporator fluid flowpath 100. The evaporator 84 is thereby operable to heat the water using the combustion products and recuperate heat energy from the combustion products. This heating of the water may evaporate at least some or all of the liquid water flowing within the evaporator fluid flowpath 100 into gaseous water—steam. This steam (or a combination of steam and heated water) output from the evaporator 84 is directed through the steam control valve 88 to the components 106 for introduction into the core flowpath 52.

The introduction of the steam into the core flowpath 52 may improve power density and/or thermal efficiency of the engine core 32. The introduction of the steam may also or alternatively cool various components of the powerplant 20 and its engine core 32. However, introducing the steam into the core flowpath 52 also increases a mass flow of fluid (e.g., the compressed air and the steam, the combustion products and the steam, etc.) flowing through the core flowpath 52 at and downstream of a location 108 (schematically shown) where the steam is introduced—the steam introduction location. Under certain conditions, a large increase in the core flowpath fluid mass flow may lead to compressor instability; e.g., instability in the HPC section 34B and/or the LPC section 34A. For example, introduction of the steam into the core flowpath 52 upstream of the turbine section 36 (e.g., at or upstream of the combustor 68) may raise an operating line of the compressor section 34; e.g., the HPC section 34B and/or the LPC section 34A. Therefore, to control the operating line of the compressor section 34 and/or to reduce or prevent compressor instability while retaining the benefits associated with introducing the steam into the core flowpath 52, the bypass system 82 is configured to selectively bleed off fluid from the core flowpath 52 to regulate the flowpath fluid mass flow at and downstream of the steam introduction location 108.

The bypass system 82 of FIG. 1 includes a bypass circuit 110 with a bypass control valve 112. The bypass circuit 110 extends from an upstream bypass inlet 114 into the bypass system 82 and its bypass circuit 110 to a downstream bypass outlet 116 from the bypass system 82 and its bypass circuit 110.

The bypass inlet 114 is configured to bleed fluid from the core flowpath 52, which fluid may be the compressed air or a combination of the compressed air and the steam. The bypass inlet 114 of FIG. 1, for example, is disposed along the core flowpath 52 at (e.g., on, adjacent or proximate) the steam introduction location 108. In another example, the bypass inlet 114 may be disposed along the core flowpath 52 upstream of (and spaced from) the steam introduction location 108; see dashed line 118. In another example, the bypass inlet 114 may be disposed along the core flowpath 52 downstream of (and spaced from) the steam introduction location 108; see dashed line 120. In yet another example, the bypass system 82 may include multiple bypass inlets arranged at various locations along the core flowpath 52 and at, upstream and/or downstream of the steam introduction location 108.

The bypass outlet 116 is configured to reintroduce the fluid (bled by the bypass inlet 114) into the core flowpath 52 at a location between the turbine section 36 and the core exhaust 58. The bypass outlet 116 of FIG. 1, for example, is disposed within the exhaust section 37 along the core flowpath 52 between the condenser 90 (and the water separator 92) and the core exhaust 58. The fluid may be reintroduced back into the core flowpath 52 downstream of the heat exchanger(s) 84 and/or 90 since that fluid is typically cooler than the combustion products exhausted from the turbine section 36 and its HPT section 36A. Thus, the reintroduction of the fluid into the core flowpath 52 may have little or no effect on the operability of the upstream heat exchanger(s) 84 and/or 90. However, it is contemplated the bypass outlet 116 (or an additional bypass outlet) may be disposed upstream of the one or more of the heat exchanger(s) 84 and/or 90 (e.g., but, downstream of the turbine section 36) in select other applications. In addition, the fluid is reintroduced into the core flowpath 52 (rather than being vented directly into the external environment 64) to recapture some of the thrust potential of the bled fluid.

The bypass control valve 112 is arranged along the bypass circuit 110 between the bypass inlet 114 and the bypass outlet 116. This bypass control valve 112 may be fully closed (e.g., shut) to fluidly decouple the bypass inlet 114 from the bypass outlet 116. The bypass control valve 112 may thereby stop bleeding of the fluid from the core flowpath 52 through the bypass inlet 114. The bypass control valve 112 may be fully opened to fluidly couple the bypass inlet 114 to the bypass outlet 116. The bypass control valve 112 may thereby facilitate full bleeding of the fluid from the core flowpath 52 through the bypass inlet 114. The bypass control valve 112 may also or alternatively be arranged in one or more intermediate positions where that valve 112 is partially opened/partially closed. The bypass control valve 112 may thereby selectively meter the fluid bled from the core flowpath 52 through the bypass inlet 114.

The steam system 80 and the bypass system 82 may be configured for various modes of operation. For example, during a steam-bypass mode of operation, the steam system 80 may operate as described above to introduce the steam into the core flowpath 52. Also during this steam-bypass operating mode, the bypass system 82 may operate as described above to bleed off some of the bleed fluid from the core flowpath 52 to reduce the core flowpath fluid mass flow at and downstream of the steam introduction location 108. This steam-bypass operating mode may be implemented when a flowrate of the steam into the core flowpath 52 is relatively high and/or for certain engine operating modes (e.g., certain thrust settings) and/or for certain flight conditions (e.g., environmental conditions, flight maneuvers, etc.). Note, during this steam-bypass operating mode, the bleed rate of the bleed system—the flowrate of the bleed fluid into the bleed system through the bypass inlet 114—may be adjusted (e.g., changed) based on the flowrate of the steam into the core flowpath 52 and/or other operating parameters. By adjusting the bleed rate, operation of the powerplant 20 and its engine core 32 may be optimized.

During a base mode of operation, the introduction of the steam into the core flowpath 52 may be limited or stopped. For example, rather than introducing the steam into the core flowpath 52, a level of the water in the water reservoir 94 may be increased. Alternatively, the steam system 80 may be turned off so as to stop recovering water, evaporating water and/or introducing steam. Also during this base operating mode, the bypass system 82 may be turned off. More particularly, the bypass system 82 and its bypass control valve 112 may be operated to limit or stop the bleeding of fluid from the core flowpath 52 through the bypass inlet 114. Thus, the engine core 32 may operate without steam or core bypass.

During a steam mode of operation, the steam system 80 may operate as described above to introduce the steam into the core flowpath 52. Also during this steam operating mode, the bypass system 82 may be turned off. More particularly, the bypass system 82 and its bypass control valve 112 may be operated to limit or stop the bleeding of fluid from the core flowpath 52 through the bypass inlet 114. Thus, the engine core 32 may operate with steam, but without core bypass.

Operation of the steam system 80 and the bypass system 82 may be coordinated using a controller 122. This controller 122 is in signal communication with the steam system 80 and the bypass system 82. The controller 122 of FIG. 1, for example, is hardwired and/or wirelessly coupled to the steam control valve 88 and the bypass control valve 112. This controller 122 may also be coupled to the water flow regulator 96. The controller 122 may be implemented with a combination of hardware and software. The hardware may include memory 124 and at least one processing device 126, which processing device 126 may include one or more single-core and/or multi-core processors. The hardware may also or alternatively include analog and/or digital circuitry other than that described above.

The memory 124 is configured to store software (e.g., program instructions) for execution by the processing device 126, which software execution may control and/or facilitate performance of one or more operations such as those described above. The memory 124 may be a non-transitory computer readable medium. For example, the memory 124 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3:
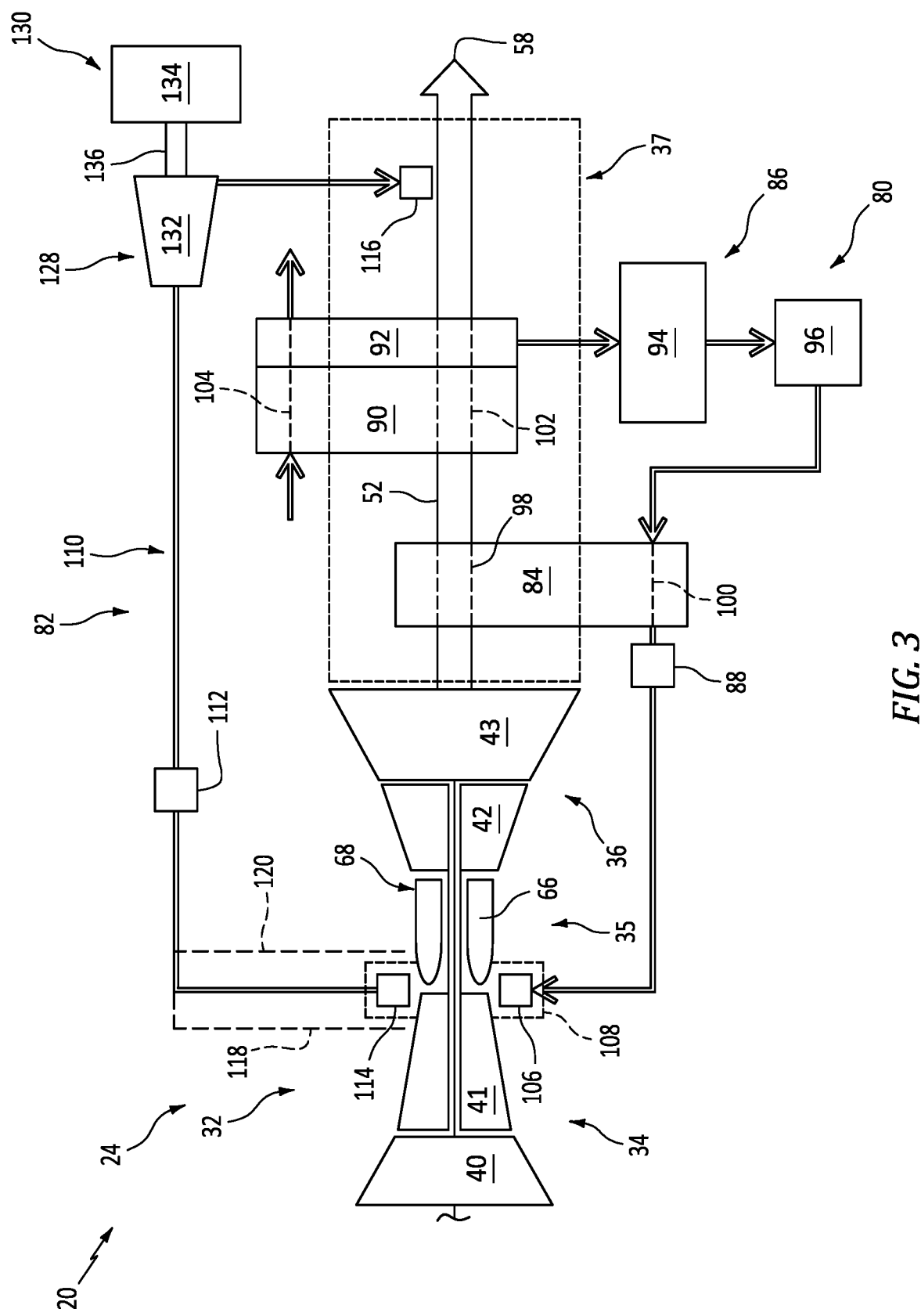
FIG. 3 is a partial schematic illustration of the powerplant with a turbine integrated into the bypass system.

In some embodiments, referring to FIG. 3, the bypass system 82 may also include a bypass turbine 128; e.g., a mini expansion turbine. This bypass turbine 128 of FIG. 3 is fluidly coupled inline along the bypass circuit 110 between the bypass control valve 112 and the bypass outlet 116. The bypass turbine 128 is configured to power a second mechanical load 130. The bypass turbine 128 of FIG. 3, for example, includes a bladed turbine rotor 132 disposed in/along a flowpath of the bypass circuit 110. This turbine rotor 132 is connected to a second driven rotor 134 of the second mechanical load 130 through a drivetrain 136; e.g., at least one shaft, a geartrain, etc. The second driven rotor 134 may be configured as a bladed thrust rotor. The second driven rotor 134 may also or alternatively be configured as a generator rotor. The second driven rotor 134 may also or alternatively be configured as a driver for one or more pumps. The second driven rotor 134 may still also or alternatively be configured as a part of (or coupled via a drivetrain) an engine spool, which engine spool may include the compressor rotor 40 or 41. The bypass turbine 128 may thereby provide mechanical power back to the powerplant engine 24 and its turbine engine core 32. The present disclosure, however, is not limited to the foregoing exemplary second driven rotor configurations. Furthermore, while the second mechanical load 130 and its second driven rotor 134 are described as discrete elements from the mechanical load 22 and its driven rotor 26 (see FIG. 1), it is contemplated the mechanical loads 22 and 130 and the driven rotors 26 and 134 may be the same in other embodiments.

Figure 4:
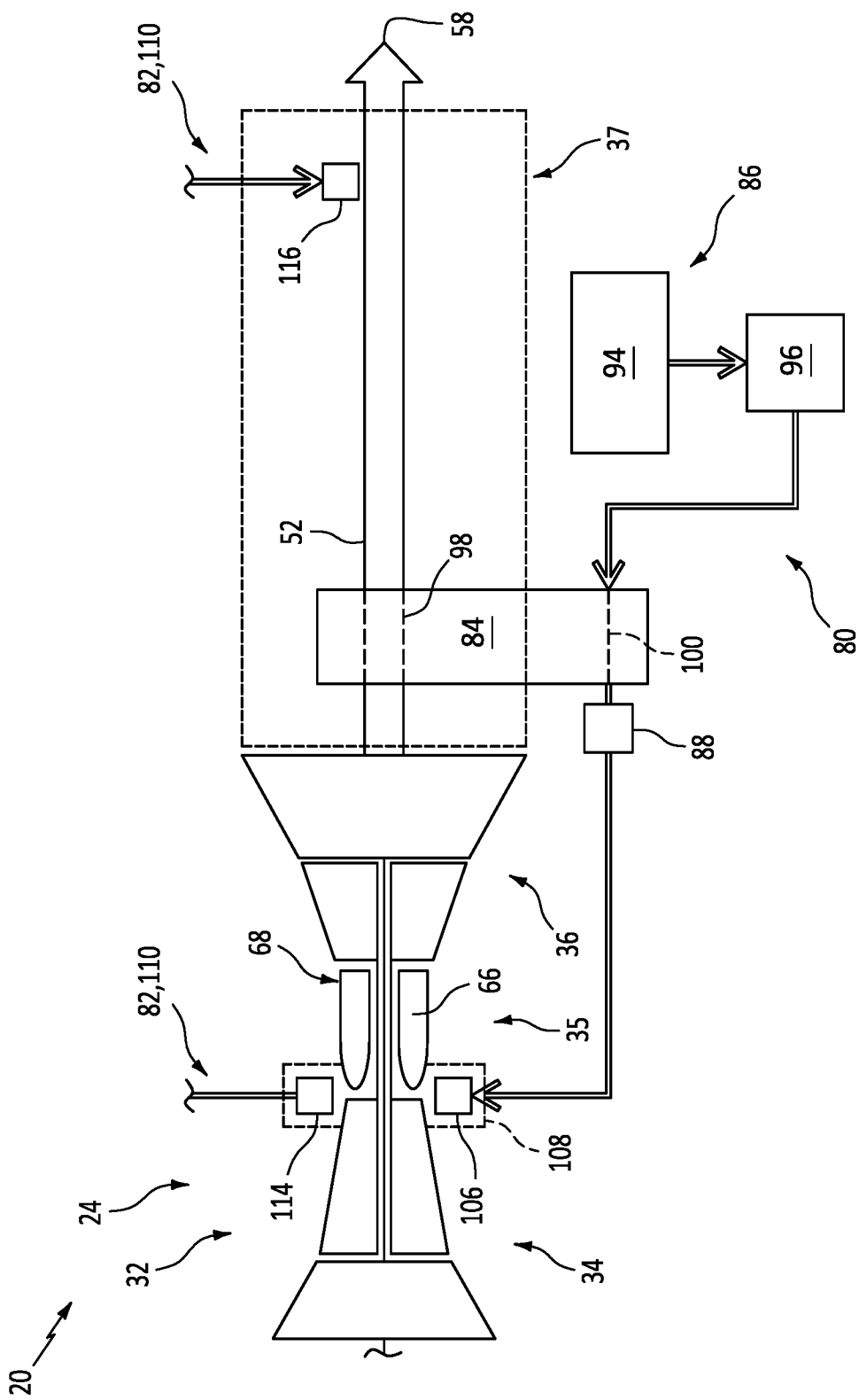
FIG. 4 is a partial schematic illustration of the powerplant with an alternative water source.

The water source 86 of FIG. 1 is described above as an arrangement of the components 90, 92, 94 and 96 which operate together to recover the water from the combustion products flowing through the core flowpath 52. In other embodiments however, referring to FIG. 4, the water source 86 may alternatively be configured without the condenser 90 and the water separator 92 (see FIG. 1). The water reservoir 94, for example, may be filled with the water from another off-board water source prior to an aircraft flight.

The steam system 80 and/or the bypass system 82 may be included with various turbine engines other than the one described above. The steam system 80 and/or the bypass system 82, for example, may be included in a geared turbine engine where a geartrain connects one or more shafts to one or more rotors. Alternatively, the steam system 80 and/or the bypass system 82 may be included in a turbine engine configured without a geartrain. The steam system 80 and/or the bypass system 82 may be included in a geared or non-geared turbine engine configured with a single spool, with two spools, or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:
 a turbine engine core including a flowpath, a compressor section, a combustor section, a low pressure turbine section, and a high pressure turbine section between the combustor section and the low pressure turbine section along the flowpath, the flowpath extending through the compressor section, the combustor section, the high pressure turbine section, and the low pressure turbine section from an inlet into the flowpath to an exhaust from the flowpath;
 a steam system comprising an evaporator disposed along the flowpath downstream of the low pressure turbine section, the steam system configured to evaporate water into steam using the evaporator, and the steam system configured to introduce the steam into the flowpath upstream of the low pressure turbine section at a steam flowrate;

a bypass system configured to bleed fluid from the flowpath upstream of the low pressure turbine section at a bleed rate to provide bleed fluid, and the bypass system configured to direct the bleed fluid into the flowpath at a bleed fluid introduction location downstream of the evaporator and upstream of the exhaust from the flowpath, wherein the bleed fluid introduction location is selected such that bleed fluid is reintroduced into the flowpath to recapture thrust potential of the bleed fluid; and a controller in signal communication with the steam system and the bypass system, the controller configured to operate the bypass system to adjust the bleed rate based on the steam flowrate.

2. The powerplant of claim 1, wherein
the steam system is configured to introduce the steam into the flowpath at a steam introduction location along the flowpath; and
the bypass system is configured to bleed the fluid from the flowpath upstream of the steam introduction location along the flowpath.

3. The powerplant of claim 1, wherein
the steam system is configured to introduce the steam into the flowpath at a steam introduction location along the flowpath; and
the bypass system is configured to bleed the fluid from the flowpath at the steam introduction location along the flowpath.

4. The powerplant of claim 1, wherein
the steam system is configured to introduce the steam into the flowpath at a steam introduction location along the flowpath; and
the bypass system is configured to bleed the fluid from the flowpath downstream of the steam introduction location along the flowpath.

5. The powerplant of claim 1, wherein
the steam system further comprises a water source configured to provide the water evaporated using the evaporator; and
the water source comprises a water reservoir.

6. The powerplant of claim 1, wherein
the steam system further comprises a water source configured to provide the water evaporated using the evaporator; and
the water source comprises a condenser disposed along the flowpath downstream of the evaporator.

7. The powerplant of claim 6, wherein the bypass system is configured to direct the bleed fluid into the flowpath downstream of the condenser.

8. The powerplant of claim 6, wherein the steam system is configured to condense water vapor flowing through the flowpath into the water using the condenser.

9. The powerplant of claim 1, wherein the bypass system includes a turbine driven by the bleed fluid.

10. The powerplant of claim 9, wherein the turbine is configured to at least partially power a mechanical load outside of the turbine engine core.

11. The powerplant of claim 9, wherein the turbine is configured to at least partially power a mechanical load within the turbine engine core.

12. The powerplant of claim 1, wherein
the steam system is configured to introduce the steam into the flowpath during a first mode of operation; and
the bypass system is configured to bleed the fluid from the flowpath during the first mode of operation.

13. The powerplant of claim 12, wherein
the steam system does not introduce the steam into the flowpath during a second mode of operation that is different than the first mode of operation; and
the bypass system does not bleed the fluid from the flowpath during the second mode of operation.

14. The powerplant of claim 12, wherein
the steam system is configured to introduce the steam into the flowpath during a second mode of operation; and
the bypass system does not bleed the fluid from the flowpath during the second mode of operation.

15. The powerplant of claim 1, wherein the bypass system is configured to bleed the fluid from the flowpath when the steam system introduces the steam into the flowpath to maintain a mass flow through at least one of the combustor section or the low pressure turbine section below a threshold.

16. The powerplant of claim 1, further comprising:
a mechanical load;
the turbine engine core configured to power the mechanical load.

17. The powerplant of claim 16, wherein the mechanical load comprises a thrust rotor.

18. The powerplant of claim 1, wherein the bypass system is configured to bleed the fluid from the flowpath between the low pressure turbine section and the exhaust from the flowpath.

19. A powerplant for an aircraft, comprising:
a turbine engine core including a flowpath, a compressor section, a combustor section, a high pressure turbine section and a low pressure turbine section, the flowpath extending through the compressor section, the combustor section, the high pressure turbine section and the low pressure turbine section from an inlet into the flowpath to an exhaust from the flowpath;
a controller in signal communication with a steam system and a bypass system;
the steam system configured to evaporate water into steam, and the steam system configured to introduce the steam into the flowpath upstream of the high pressure turbine section at a steam flowrate; and
the bypass system configured to bleed fluid from the flowpath upstream of the high pressure turbine section at a bleed rate to provide bleed fluid, the bypass system configured to direct the bleed fluid into the flowpath downstream of the low pressure turbine section, and the controller configured to operate the bypass system to adjust the bleed rate based on the steam flowrate.

20. A powerplant for an aircraft, comprising:
a turbine engine core including a flowpath, a compressor section, a combustor section and a turbine section, the flowpath extending through the compressor section, the combustor section and the turbine section from an inlet into the flowpath to an exhaust from the flowpath;
a controller in signal communication with a steam system and a bypass system;
the steam system configured to condense water vapor flowing through a region of the flowpath into the water, the steam system configured to collect the water and then evaporate the water to provide steam, and the steam system configured to introduce the steam into the flowpath; and
the bypass system configured to bleed fluid from the flowpath upstream of the region of the flowpath to provide bleed fluid, the bypass system configured to direct the bleed fluid into the flowpath downstream of the region of the flowpath, the bypass system including a turbine driven by the bleed fluid;

wherein the controller is configured to operate the bypass system to adjust a bleed rate based on a steam flowrate of the steam system.

* * * * *